United States Patent
Hamada et al.

(10) Patent No.: US 10,006,649 B2
(45) Date of Patent: Jun. 26, 2018

(54) AIR-CONDITIONING SYSTEM

(71) Applicants: Mamoru Hamada, Tokyo (JP); Fumitake Unezaki, Tokyo (JP); Naomichi Tamura, Tokyo (JP); Kazunobu Nishimiya, Tokyo (JP); Hidemoto Arai, Tokyo (JP)

(72) Inventors: Mamoru Hamada, Tokyo (JP); Fumitake Unezaki, Tokyo (JP); Naomichi Tamura, Tokyo (JP); Kazunobu Nishimiya, Tokyo (JP); Hidemoto Arai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 255 days.

(21) Appl. No.: 14/766,531

(22) PCT Filed: Mar. 5, 2013

(86) PCT No.: PCT/JP2013/055925
§ 371 (c)(1),
(2) Date: Aug. 7, 2015

(87) PCT Pub. No.: WO2014/136199
PCT Pub. Date: Sep. 12, 2014

(65) Prior Publication Data
US 2015/0362200 A1 Dec. 17, 2015

(51) Int. Cl.
*F24F 5/00* (2006.01)
*F25B 13/00* (2006.01)
(Continued)

(52) U.S. Cl.
CPC .............. *F24F 5/001* (2013.01); *F24F 3/065* (2013.01); *F24F 11/83* (2018.01); *F25B 7/00* (2013.01);
(Continued)

(58) Field of Classification Search
CPC .... F24F 3/065; F24F 5/001; F24F 2001/0051; F24F 2011/0013; F24F 2011/0016;
(Continued)

(56) References Cited

U.S. PATENT DOCUMENTS

| 4,759,195 A | 7/1988 | Biancardi |
| 5,950,442 A * | 9/1999 | Maeda ................. F24F 3/1423 62/175 |

(Continued)

FOREIGN PATENT DOCUMENTS

| CN | 101163928 A | 4/2008 |
| CN | 202066156 U | 12/2011 |

(Continued)

OTHER PUBLICATIONS

English Translation of JP2010065977A.*

(Continued)

*Primary Examiner* — David Teitelbaum
*Assistant Examiner* — Schyler S Sanks
(74) *Attorney, Agent, or Firm* — Posz Law Group, PLC

(57) ABSTRACT

An air-conditioning system is configured to determine an evaporating temperature control range of a first refrigerant circuit on the basis of the temperature of outdoor air, control an evaporating temperature of the first refrigerant circuit to a target evaporating temperature determined within the evaporating temperature control range of the first refrigerant circuit, determine an evaporating temperature control range of a second refrigerant circuit on the basis of the humidity of the outdoor air, and control an evaporating temperature of the second refrigerant circuit to a target evaporating temperature determined within the evaporating temperature control range of the second refrigerant circuit.

6 Claims, 8 Drawing Sheets

(51) Int. Cl.
*F25B 49/02* (2006.01)
*F25B 7/00* (2006.01)
*F24F 3/06* (2006.01)
*F24F 1/00* (2011.01)

(52) U.S. Cl.
CPC ............ *F25B 13/00* (2013.01); *F25B 49/022* (2013.01); *F24F 2001/0051* (2013.01); *F24F 2110/12* (2018.01); *F24F 2110/22* (2018.01); *F24F 2140/20* (2018.01); *F25B 2313/0233* (2013.01); *F25B 2400/061* (2013.01); *F25B 2600/0253* (2013.01); *F25B 2700/21151* (2013.01); *Y02B 30/741* (2013.01)

(58) Field of Classification Search
CPC ............... F24F 11/0015; F24F 11/0012; F24F 2011/0045; F25B 2700/21151; F25B 2400/061
See application file for complete search history.

(56) References Cited

U.S. PATENT DOCUMENTS

| | | | | |
|---|---|---|---|---|
| 6,701,732 | B2 * | 3/2004 | Shimoda | F25B 13/00 62/228.3 |
| 6,755,035 | B1 | 6/2004 | McNamara et al. | |
| 2003/0121271 | A1 * | 7/2003 | Dinnage | F24F 3/1405 62/94 |
| 2007/0180844 | A1 * | 8/2007 | Fujiyoshi | F24F 3/065 62/271 |
| 2009/0064697 | A1 | 3/2009 | Kondo et al. | |
| 2011/0132011 | A1 * | 6/2011 | Kojima | F24F 11/0079 62/180 |
| 2012/0010753 | A1 * | 1/2012 | Schuster | F25B 49/02 700/276 |
| 2012/0174611 | A1 * | 7/2012 | Yamashita | F24F 3/065 62/204 |

FOREIGN PATENT DOCUMENTS

| | | |
|---|---|---|
| EP | 1 462 729 A2 | 9/2004 |
| JP | H10-259944 A | 9/1998 |
| JP | 2005-049059 A | 2/2005 |
| JP | 2010065977 A * | 3/2010 |
| JP | 2010-071587 A | 4/2010 |
| JP | 2011-064407 A | 3/2011 |
| JP | 2012-127649 A | 7/2012 |
| JP | 2012-141118 A | 7/2012 |
| WO | 03/029728 A1 | 4/2003 |
| WO | 2009/011362 A1 | 1/2009 |
| WO | WO 2011052040 A1 * | 5/2011 ............. F24F 3/065 |

OTHER PUBLICATIONS

Humidity and Temperature Sensor—DHT22, Sparkfun Electronics, Jul. 2011.*
English Translation of WO2011052040A1 is US20120174611, cited above.*
Office Action dated Jun. 7, 2016 in the corresponding JP patent application No. 2015-504037 (with English translation).
European Extended Search Report dated Oct. 14, 2016 in the corresponding EP application No. 13877050.8.
International Search Report of the International Searching Authority dated May 28, 2013 for the corresponding international application No. PCT/JP2013/055925 (and English translation).
Office Action dated Jan. 5, 2017 in the corresponding CN patent application No. 2013800741801 (with English translation).
Office Action dated Jul. 21, 2017 in corresponding CN patent application No. 2013800741801 (with English translation).

* cited by examiner

INDOOR SPACE

REFRIGERANT FLOW

FIG. 5
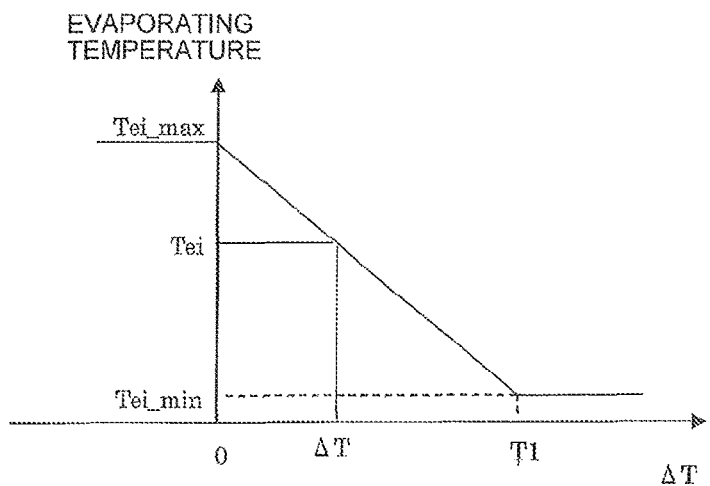
FIG. 6
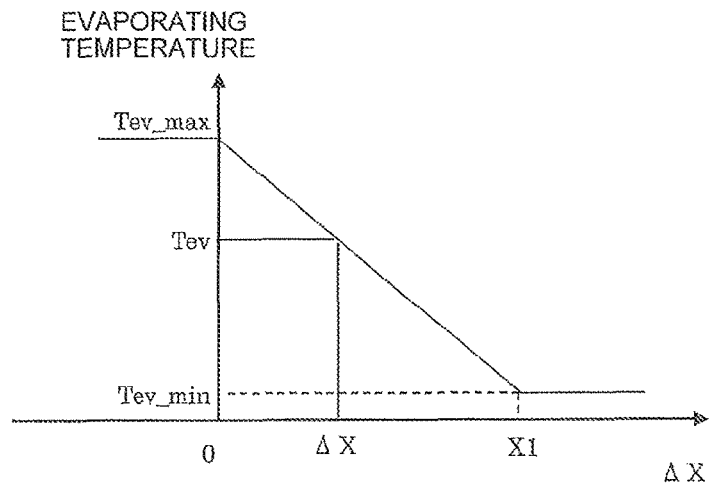
FIG. 7
|  | INDOOR UNIT CIRCUIT | | VENTILATOR CIRCUIT | |
|---|---|---|---|---|
|  | Tei_max | Tei_min | Tev_max | Tev_min |
| Hi LEVEL | Tei_hi_max | Tei_hi_min | Tev_hi_max | Tev_hi_min |
| Lo LEVEL | Tei_lo_max | Tei_lo_min | Tev_lo_max | Tev_lo_min |

AIR-CONDITIONING SYSTEM

CROSS REFERENCE TO RELATED APPLICATION

This application is a U.S. national stage application of International Application No. PCT/JP2013/055925 filed on Mar. 5, 2013, the disclosure of which is incorporated by reference.

TECHNICAL FIELD

The present invention relates to an air-conditioning system including a ventilator.

BACKGROUND ART

A related-art air-conditioning system including a ventilator includes a refrigerant circuit including a compressor, a four-way valve, an outdoor heat exchanger, an expansion unit, and an indoor heat exchanger. The refrigerant circuit is filled with refrigerant. During cooling, the refrigerant is compressed into high-temperature high-pressure gas refrigerant by the compressor and is then delivered to the outdoor heat exchanger. The refrigerant which has flowed into the outdoor heat exchanger radiates heat to air and thus liquefies.

The liquefied refrigerant is subjected to pressure reduction into a two-phase gas-liquid state by the expansion unit. In the indoor heat exchanger, the refrigerant removes heat from ambient air and thus gasifies. On the other hand, the air from which heat has been removed can cool an indoor space. The gasified refrigerant returns to the compressor.

The ventilator performs an operation of exchanging indoor air for outdoor fresh air. A high enthalpy of air introduced from outdoor air during cooling causes a cooling load (outdoor air load). Examples of other loads include a load (indoor load) generated in an indoor space and a load (overall heat transfer load) due to heat entering through a wall of a structure.

It is necessary for air-conditioning devices to process the outdoor air load, the indoor load, and the overall heat transfer load. The outdoor air load and the indoor load include a latent heat load as well as a sensible heat load. Related-art air-conditioning systems have processed the latent heat load while keeping a temperature (refrigerant evaporating temperature) in the indoor heat exchanger at a constant low temperature.

In such an operation of processing the latent heat load while the evaporating temperature is kept at a constant low temperature, however, operation efficiency (energy efficiency) is reduced because the operation is performed while the low evaporating temperature, which leads to a large power consumption, is kept regardless of load. Increasing the evaporating temperature can reduce the power consumption, thus improving the operation efficiency. Disadvantageously, however, latent heat will be processed insufficiently, causing an increase in humidity of indoor air. This may result in a reduction in comfort.

An air-conditioning system has recently been developed which sets an evaporating temperature upper limit determined on the basis of the humidity of indoor air and controls an evaporating temperature within a range at or below the set evaporating temperature upper limit on the basis of the evaporating temperature, the temperature and humidity of indoor air, and a set temperature while avoiding insufficient processing of latent heat (see, for example, Patent Literature 1).

CITATION LIST

Patent Literature

Patent Literature 1: International Publication No. WO 2003/029728 (refer to pp. 3-4, for example)

SUMMARY OF INVENTION

Technical Problem

Control performed by the air-conditioning system disclosed in Patent Literature 1, however, does not take the outdoor air load into account. If the humidity of outdoor air is high, the latent heat will be insufficiently processed, causing an increase in humidity. Disadvantageously, this may result in a reduction in comfort. On the other hand, if the humidity of outdoor air is low, the latent heat will be processed more than is necessary, causing an increase in power consumption (or a reduction in energy-saving performance).

The present invention has been made to overcome the above-described disadvantages, and aims to provide an air-conditioning system that takes into account the outdoor air load, avoids a reduction in comfort caused by insufficient processing of latent heat (or insufficient dehumidification) and a reduction in energy-saving performance caused by excessive processing of latent heat, and enhances the energy-saving performance while maintaining comfort (or maintaining comfortable temperature and humidity levels).

Solution to Problem

The present invention provides an air-conditioning system including a first refrigerant circuit configured to circulate therein a first refrigerant and which includes a first outdoor unit and an indoor unit, and a second refrigerant circuit configured to circulate therein a second refrigerant and which includes a second outdoor unit and a ventilator. The first refrigerant circuit includes a first compressor, a first outdoor heat exchanger, a first expansion valve, and an indoor heat exchanger. The second refrigerant circuit includes a second compressor, a second outdoor heat exchanger, a second expansion valve, and a cooler. The first outdoor unit includes the first compressor and the first outdoor heat exchanger. The second outdoor unit includes the second compressor and the second outdoor heat exchanger. The indoor unit includes the first expansion valve and the indoor heat exchanger, and is configured to allow circulation of indoor air while controlling a temperature of the indoor air. The ventilator includes the second expansion valve and the cooler, and is configured to exchange the indoor air for outdoor air and control a temperature of the exchanged indoor air and outdoor air. The first outdoor unit is connected to the indoor unit by refrigerant piping. The second outdoor unit is connected to the ventilator by refrigerant piping. The air-conditioning system further includes a unit detecting a temperature and a humidity of the outdoor air. The first refrigerant circuit has an evaporating temperature control range that is determined on the basis of the temperature of the outdoor air. The first refrigerant circuit has an evaporating temperature that is controlled to a target evaporating temperature determined within the evaporating temperature control range of the first refrigerant circuit. The second refrigerant circuit has an evaporating temperature control range that is determined on the basis of the humidity of the outdoor air. The second refrigerant circuit has an evaporating temperature that is controlled to a target evaporating temperature determined within the evaporating temperature control range of the second refrigerant circuit.

Advantageous Effects of Invention

The air-conditioning system according to the present invention can control the evaporating temperature in accordance with an outdoor air load determined on the basis of the temperature and humidity of outdoor air to increase the evaporating temperature while reliably processing a sensible heat load and a latent heat load, thus enhancing the energy-saving performance while maintaining comfort.

BRIEF DESCRIPTION OF DRAWINGS

FIG. 5 is a Tei-$\Delta$T graph 1 of the air-conditioning system according to Embodiment of the present invention.

FIG. 6 is a Tev-$\Delta$X graph 1 of the air-conditioning system according to Embodiment of the present invention.

FIG. 7 is a table illustrating evaporating temperature control ranges of the air-conditioning system according to Embodiment of the present invention.

DESCRIPTION OF EMBODIMENT

Embodiment of the present invention will be described below with reference to the drawings.

Embodiment

Figure 1:
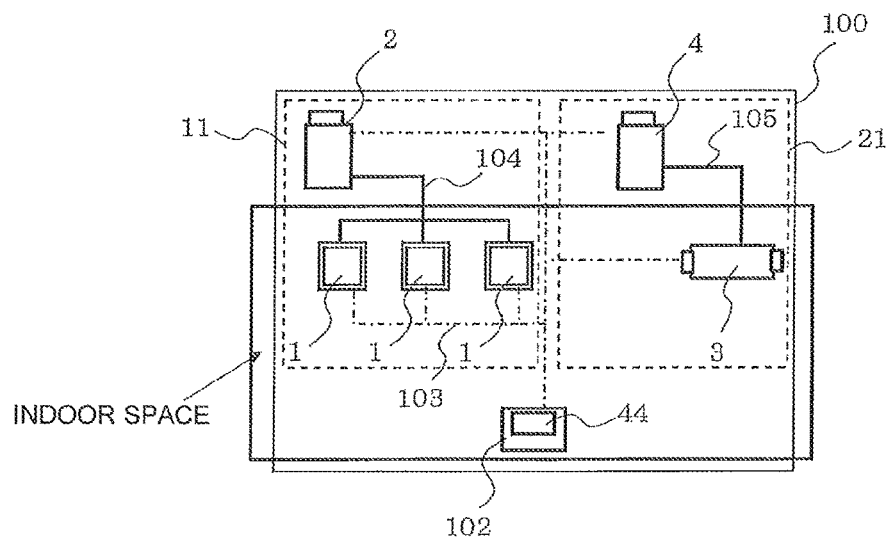
FIG. 1 is a schematic diagram of an air-conditioning system according to Embodiment of the present invention.
Figure 2:
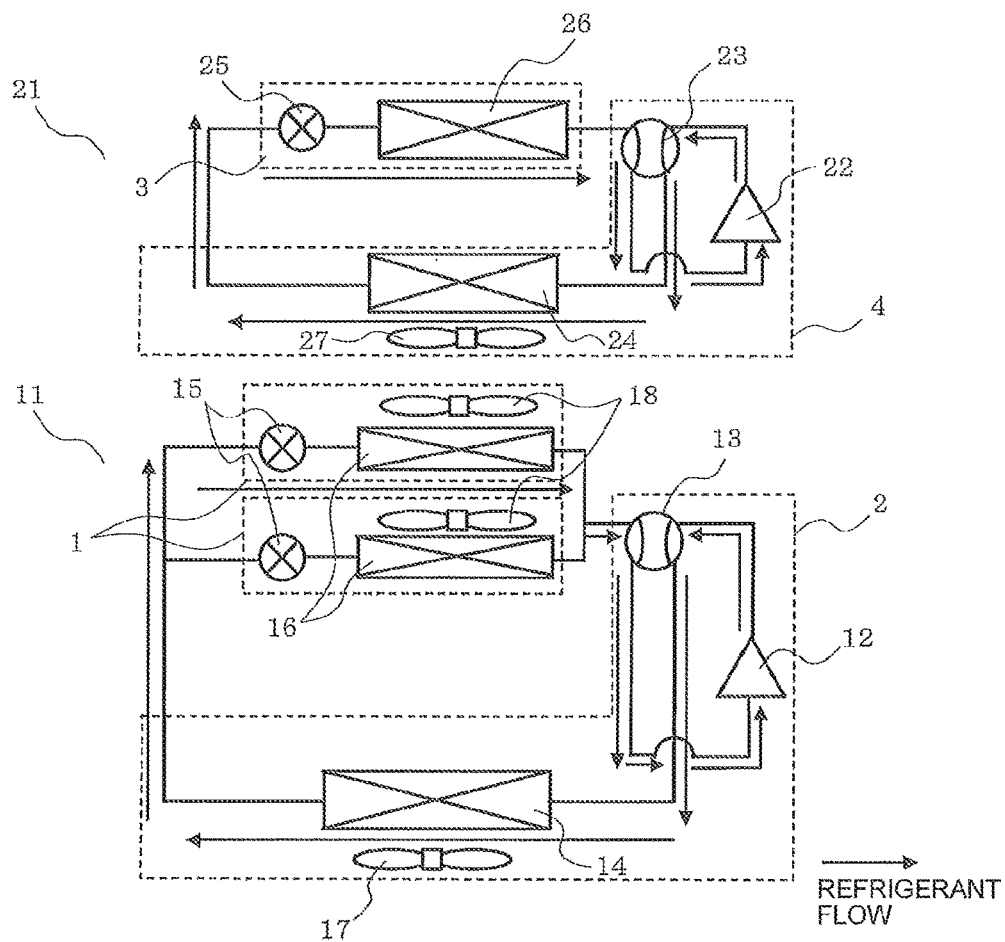
FIG. 2 is a refrigerant circuit diagram 1 of the air-conditioning system according to Embodiment of the present invention.

FIG. 1 is a schematic diagram of an air-conditioning system according to Embodiment of the present invention. FIG. 2 is a refrigerant circuit diagram 1 of the air-conditioning system according to Embodiment of the present invention.

The configuration of an air-conditioning system 100 will now be described.

The air-conditioning system 100 is installed in a building, a condominium, or other constraints, and is capable of processing a cooling load or a heating load by using a refrigerant circuit through which refrigerant is circulated. The air-conditioning system 100 includes two refrigerant circuits, an indoor unit circuit 11 (first refrigerant circuit) and a ventilator circuit 21 (second refrigerant circuit). These circuits are connected to a central controller 102 by transmission lines 103. The central controller 102 includes a target temperature and humidity setting unit 44. The central controller 102 controls the air-conditioning system 100.

In the indoor unit circuit 11, for example, each of three indoor units 1 is connected to an indoor-unit-circuit outdoor unit 2 by refrigerant piping 104. In the ventilator circuit 21, for example, one ventilator 3 is connected to a ventilator-circuit outdoor unit 4 by refrigerant piping 105.

Each of the indoor units 1, the indoor-unit-circuit outdoor unit 2, the ventilator 3, and the ventilator-circuit outdoor unit 4 is connected to the central controller 102 by a transmission line 103.

Although three indoor units 1 are provided and the number of ventilators 3 is one in Embodiment, another number of units 1 and another number of ventilators 3 may be arranged.

The indoor unit circuit 11 includes a compressor 12, a four-way valve 13, an outdoor heat exchanger 14 provided with an outdoor-heat-exchanger fan 17, an expansion valve 15, and an indoor heat exchanger 16 provided with an indoor-heat-exchanger fan 18.

The expansion valve 15 and the indoor heat exchanger 16 are included in each indoor unit 1. The compressor 12, the four-way valve 13, and the outdoor heat exchanger 14 are included in the indoor-unit-circuit outdoor unit 2.

The ventilator circuit 21 includes a compressor 22, a four-way valve 23, an outdoor heat exchanger 24 provided with an outdoor-heat-exchanger fan 27, an expansion valve 25, and a cooler 26.

The expansion valve 25 and the cooler 26 are included in the ventilator 3. The compressor 22, the four-way valve 23, and the outdoor heat exchanger 24 are included in the ventilator-circuit outdoor unit 4.

Figure 3:
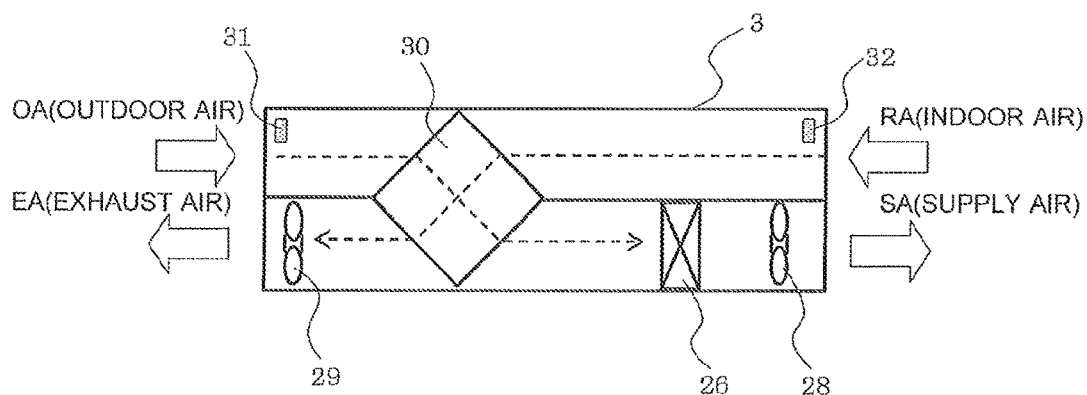
FIG. 3 is a schematic diagram of a ventilator of the air-conditioning system according to Embodiment of the present invention.

FIG. 3 is a schematic diagram of the ventilator in the air-conditioning system according to Embodiment of the present invention.

In addition to the expansion valve 25 and the cooler 26 described above, the ventilator 3 includes a supply fan 28, an exhaust fan 29, a total heat exchanger 30 that exchanges total heat between indoor air and outdoor air, an outdoor air temperature and humidity detection unit 31 that detects the temperature and humidity of outdoor air, and an indoor air temperature and humidity detection unit 32 that detects the temperature and humidity of indoor air.

The outdoor air temperature and humidity detection unit 31 is disposed at a position where the temperature and humidity of outdoor air can be detected. The indoor air temperature and humidity detection unit 32 is disposed at a position where the temperature and humidity of indoor air can be detected.

Figure 4:
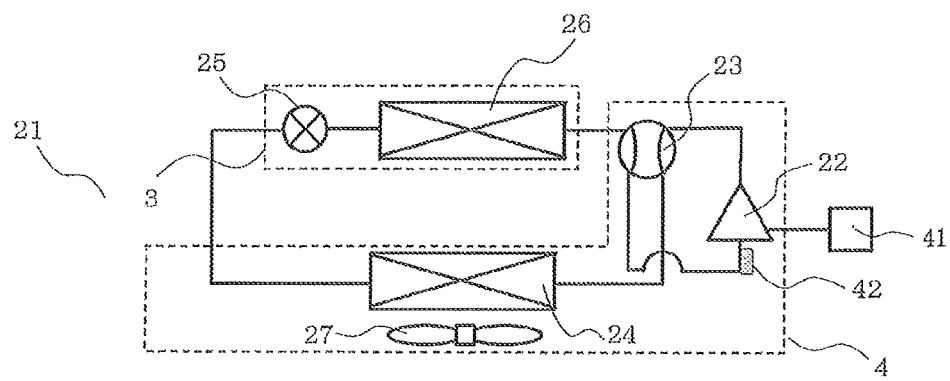
FIG. 4 is a refrigerant circuit diagram 2 of the air-conditioning system according to Embodiment of the present invention.
Figure 4:
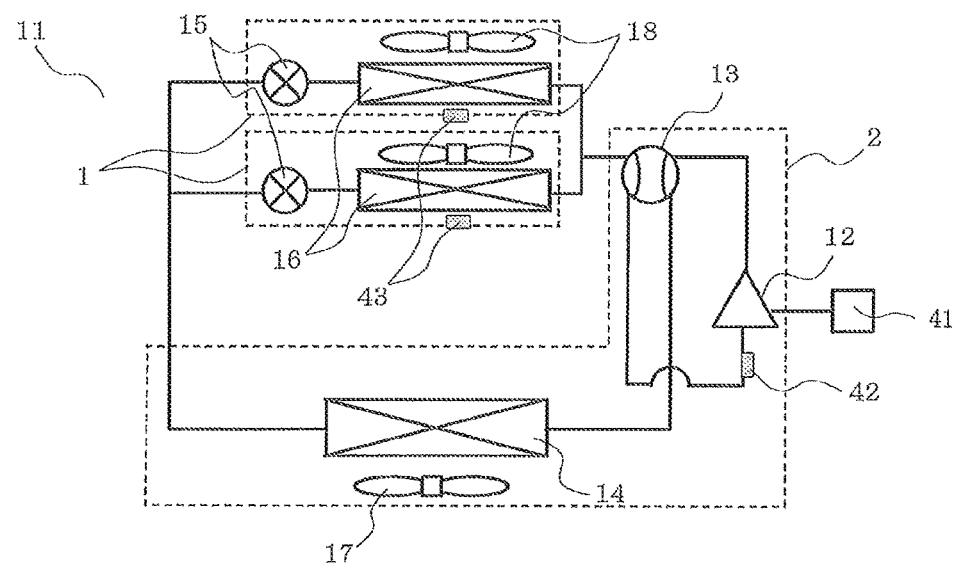

FIG. 4 is a refrigerant circuit diagram 2 of the air-conditioning system according to Embodiment of the present invention.

Each of the compressors 12 and 22 is provided with a compressor frequency control unit 41. An evaporating temperature detection unit 42 is disposed on a suction side of each of the compressors 12 and 22. In addition, each indoor unit 1 includes a suction temperature and humidity detection unit 43 disposed at a position where the temperature and humidity of sucked air can be detected.

FIG. 5 is a Tei-ΔT graph 1 of the air-conditioning system according to Embodiment of the present invention. FIG. 6 is a Tev-ΔX graph 1 of the air-conditioning system according to Embodiment of the present invention.

Note that Tei denotes a target evaporating temperature of the indoor unit circuit 11, ΔT denotes the difference between an indoor air temperature Ta (degrees C.) and a target temperature Ta_tgt (degrees C.), Tev denotes a target evaporating temperature of the ventilator circuit 21, and ΔX denotes the difference between an indoor air absolute humidity Xa (kg/kg') and a target absolute humidity Xa_tgt (kg/kg').

An operation of the air-conditioning system 100 will now be described.

In Embodiment, it is assumed that all of the indoor units 1 perform a cooling operation.

The indoor unit circuit 11 determines the target evaporating temperature Tei (degrees C.), which is a value (within an evaporating temperature control range) between a maximum evaporating temperature Tei_max (degrees C.) and a minimum evaporating temperature Tei_min (degrees C.), on the basis of the difference ΔT (degrees C.) between the indoor air temperature Ta (degrees C.) detected by the suction temperature and humidity detection unit 43 illustrated in FIG. 4 and the target temperature (set indoor temperature) Ta_tgt (degrees C.) set by the target temperature and humidity setting unit 44 illustrated in FIG. 1 and the Tei-ΔT graph of FIG. 5. The compressor frequency control unit 41 controls a frequency of the compressor 12 in the indoor-unit-circuit outdoor unit 2 so that a refrigerant evaporating temperature detected by the evaporating temperature detection unit 42 disposed on the suction side of the compressor 12 reaches the target evaporating temperature Tei, thus controlling the indoor air temperature Ta (degrees C.).

On the other hand, the ventilator circuit 21 determines the target evaporating temperature Tev (degrees C.), which is a value (within an evaporating temperature control range) between a maximum evaporating temperature Tev_max (degrees C.) and a minimum evaporating temperature Tev_min (degrees C.), on the basis of the difference ΔX (kg/kg') between the indoor air absolute humidity Xa (kg/kg') detected by the indoor air temperature and humidity detection unit 32 illustrated in FIG. 3 and the target absolute humidity (set indoor humidity) Xa_tgt (kg/kg') set by the target temperature and humidity setting unit 44 illustrated in FIG. 1 and the Tev ΔX graph of FIG. 6. The compressor frequency control unit 41 controls a frequency of the compressor 22 in the ventilator-circuit outdoor unit 4 so that a refrigerant evaporating temperature detected by the evaporating temperature detection unit 42 disposed on the suction side of the compressor 22 reaches the target evaporating temperature Tev, thus controlling the indoor air absolute humidity Xa (kg/kg').

The term evaporating temperature control range refers to a temperature range in which the evaporating temperature is controlled. The temperatures Tei_max (degrees C.) and Tev_max (degrees C.) are upper limits of these ranges and the temperatures Tei_min (degrees C.) and Tev_min (degrees C.) are lower limits of the ranges. In other words, the evaporating temperature is controlled so as not to be out of the evaporating temperature control range.

It has been impossible to perform temperature (sensible heat) control and humidity (latent heat) control individually, and it has accordingly been difficult to allow both a temperature and a humidity to reach respective target values.

In the air-conditioning system 100, however, temperature control in the indoor unit circuit 11 and humidity control in the ventilator circuit 21 can be performed individually as described above, resulting in improved controllability. This facilitates allowing both a temperature and a humidity to reach respective target values.

FIG. 7 is a table illustrating the evaporating temperature control ranges of the air-conditioning system according to Embodiment of the present invention.

As illustrated in FIG. 7, the maximum evaporating temperature Tei_max (degrees C.) and the maximum evaporating temperature Tev_max (degrees C.), which are the upper limits of the evaporating temperature control ranges, and the minimum evaporating temperature Tei_min (degrees C.) and the minimum evaporating temperature Tev_min (degrees C.), which are the lower limits of the evaporating temperature control ranges, each have two patterns, a Hi level and a Lo level to be determined as an evaporating temperature level.

The evaporating temperature levels of the indoor unit circuit 11 and the ventilator circuit 21 are determined on the basis of temperature and humidity conditions of outdoor air. In other words, loads on the indoor unit circuit 11 and the ventilator circuit 21 are set on the basis of the temperature and humidity of outdoor air. When a load is large, the Lo levels are set. When the load is small, the Hi levels are set. Note that a Hi level value of each of Tei_max (degrees C.), Tev_max (degrees C.), Tei_min (degrees C.), and Tev_min (degrees C.) of the indoor unit circuit 11 and the ventilator circuit 21 is greater than a Lo level value of the corresponding one of them. Accordingly, the Lo level values allow higher cooling capacity (cooling capacity and dehumidifying capacity) than the Hi level values. The above-described determination enables the following: when a load is large, the cooling capacity is increased to avoid insufficient cooling and insufficient dehumidification; and when the load is small, the cooling capacity is reduced to achieve an energy saving operation.

As regards the temperature and humidity of outdoor air, values detected by the outdoor air temperature and humidity detection unit 31 illustrated in FIG. 3 are used.

Figure 8:
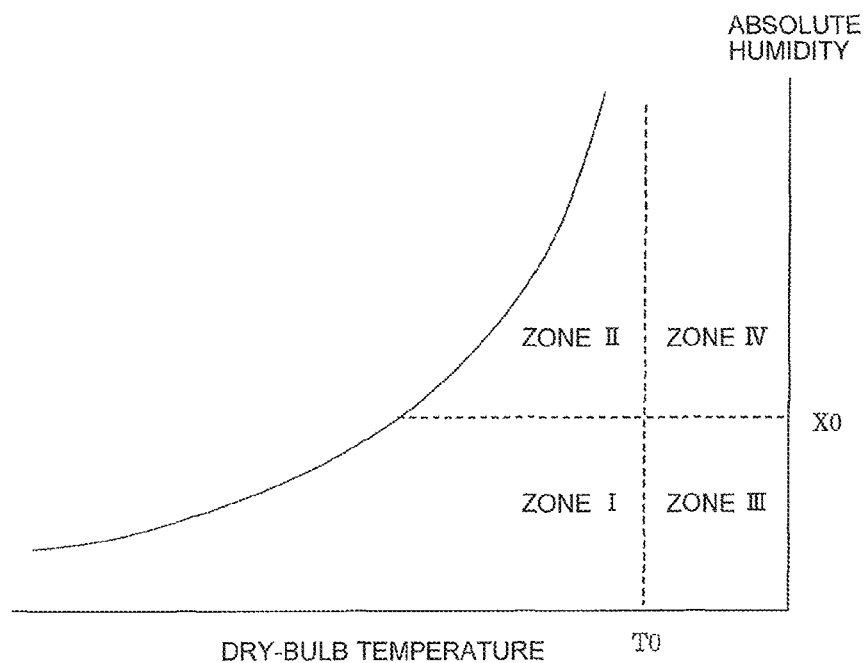
FIG. 8 is a psychrometric chart 1 of the air-conditioning system according to Embodiment of the present invention.

FIG. 8 is a psychrometric chart 1 of the air-conditioning system according to Embodiment of the present invention.

Temperature values and humidity values detected by the outdoor air temperature and humidity detection unit 31 are classified into four zones (zones I to IV) defined relative to a dry-bulb temperature threshold T0 and an absolute humidity threshold X0, as illustrated in FIG. 8.

Detected temperature and humidity values in the zone I mean that outdoor air has a low temperature and a low humidity and accordingly correspond to a low sensible heat load condition and a low latent heat load condition. Detected temperature and humidity values in the zone II mean that outdoor air has a low temperature and a high humidity and accordingly correspond to the low sensible heat load condition and a high latent heat load condition. Detected temperature and humidity values in the zone III mean that outdoor air has a high temperature and a low humidity and accordingly correspond to a high sensible heat load condition and the low latent heat load condition. Detected temperature and humidity values in the zone IV mean that outdoor air has a high temperature and a high humidity and accordingly correspond to the high sensible heat load condition and the high latent heat load condition.

The thresholds T0 and X0 will be described later.

Under the low sensible heat load condition (the zone I and the zone II), the sensible heat load on the indoor unit circuit 11, which controls sensible heat, is small. An evaporating temperature of the indoor unit circuit 11 can be increased to reduce the cooling capacity (because insufficient cooling will not occur if the evaporating temperature is increased). Accordingly, the Hi levels in FIG. 7 can be determined as the evaporating temperature levels of the indoor unit circuit 11. The target evaporating temperature Tei (degrees C.) is determined on the basis of ΔT (=Ta−Ta_tgt) (degrees C.) and the Tei-ΔT graph of FIG. 5.

Note that when ΔT is 0, the target evaporating temperature Tei (degrees C.) is determined as Tei_max=Tei_hi_max (degrees C.), when ΔT is a predetermined temperature T1, it is determined as Tei_min=Tei_hi_min (degrees C.), and while 0≤ΔT≤T1, it is determined as being a value between Tei_max (degrees C.) and Tei_min (degrees C.) and being inversely proportional to ΔT.

Under the high sensible heat load condition (the zone III and the zone IV), the sensible heat load on the indoor unit circuit 11, which controls sensible heat, is large. The evaporating temperature of the indoor unit circuit 11 has to be reduced to increase the cooling capacity. Accordingly, the Lo levels in FIG. 7 are set as the evaporating temperature levels of the indoor unit circuit 11. The target evaporating temperature Tei (degrees C.) is determined on the basis of ΔT (=Ta−Ta_tgt) (degrees C.) and the Tei-ΔT graph of FIG. 5.

Note that when ΔT is 0, the target evaporating temperature Tei (degrees C.) is determined as Tei_max=Tei_lo_max (degrees C.), when ΔT is T1, it is determined as Tei_min=Tei_lo_min (degrees C.), and while 0≤ΔT≤T1, it is determined as being a value between Tei_max (degrees C.) and Tei_min (degrees C.) and being inversely proportional to ΔT.

Under the low latent heat load condition (the zone I and the zone III), the latent heat load on the ventilator circuit 21, which controls latent heat, is small. An evaporating temperature of the ventilator circuit 21 can be increased to reduce the dehumidifying capacity (because insufficient dehumidification will not occur if the evaporating temperature is increased). Accordingly, the Hi level in FIG. 7 can be determined as the evaporating temperature level of the ventilator circuit 21. The target evaporating temperature Tev (degrees C.) is determined on the basis of ΔX (=Xa−Xa_tgt) (kg/kg') and the Tev-ΔX graph of FIG. 6.

Note that when ΔX is 0, the target evaporating temperature Tev (degrees C.) is determined as Tev_max=Tev_hi_max (degrees C.), when ΔX is a predetermined absolute humidity X1, it is determined as Tev_min=Tev_hi_min (degrees C.), and while 0≤ΔX≤X1, it is determined as being a value between Tev_max (degrees C.) and Tev_min (degrees C.) and being inversely proportional to ΔX.

Under the high latent heat load condition (the zone II and the zone IV), the latent heat load on the ventilator circuit 21, which controls latent heat, is large. The evaporating temperature of the ventilator circuit 21 has to be reduced to increase the dehumidifying capacity. Accordingly, the Lo level in FIG. 7 are determined as the evaporating temperature levels of the ventilator circuit 21. The target evaporating temperature Tev (degrees C.) is determined on the basis of ΔX (=Xa−Xa_tgt) (kg/kg') and the Tev-ΔX graph of FIG. 6.

Note that when ΔX is 0, the target evaporating temperature Tev (degrees C.) is determined as Tev_max=Tev_lo_max (degrees C.), when ΔX is X1, it is determined as Tev_min=Tev_lo_min (degrees C.), and while 0≤ΔX≤X1, it is determined as being a value between Tev_max (degrees C.) and Tev_min (degrees C.) and being inversely proportional to ΔX.

Figure 9:
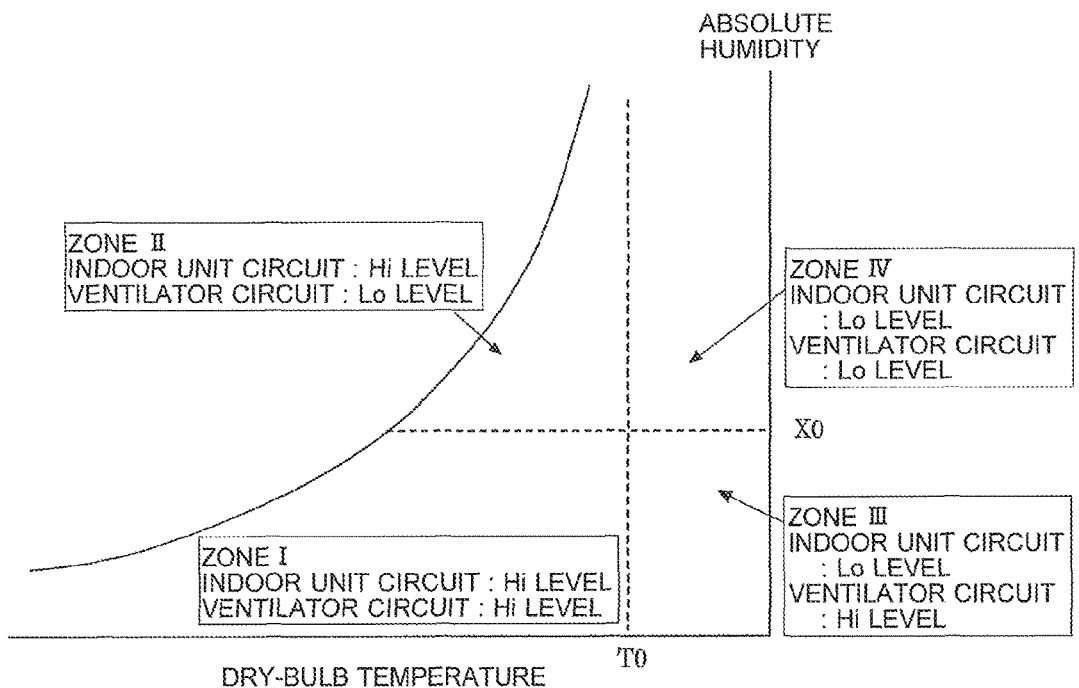
FIG. 9 is a psychrometric chart 2 of the air-conditioning system according to Embodiment of the present invention.

FIG. 9 is a psychrometric chart 2 of the air-conditioning system according to Embodiment of the present invention.

As illustrated in FIG. 9, the evaporating temperature levels of the indoor unit circuit 11 and those of the ventilator circuit 21 are determined on the basis of the temperature and humidity conditions of outdoor air in the above-described manner.

The dry-bulb temperature threshold T0 (degrees C.) and the absolute humidity threshold X0 (kg/kg'), which are threshold values for the respective zones, are determined as follows.

The threshold T0 (degrees C.) is a maximum outdoor air temperature at which a sensible heat load can be processed when the target evaporating temperature Tei (degrees C.) of the indoor unit circuit 11 is the Hi level Tei_hi_min (degrees C.). In other words, so long as the outdoor air temperature is at or below the threshold T0 (degrees C.), an indoor air temperature can reach a target temperature if the Hi-level evaporating temperature range is set.

As regards an actual sensible heat load, not only the temperature and humidity conditions of outdoor air but also an internal heat gain resulting from human bodies, outdoor air equipment, lighting equipment, and the like have to be taken into account. An approximate internal heat gain resulting from human bodies, outdoor air equipment, lighting equipment, and the like can be estimated for each structure, such as a building or a condominium, and there is little variation in this value. Accordingly, T0 can be calculated on the basis of an estimated value for each structure.

The threshold X0 (kg/kg') is a maximum outdoor air absolute humidity at which a latent heat load can be processed when the target evaporating temperature Tev (degrees C.) of the ventilator circuit 21 is the Hi level Tev_hi_min (degrees C.). In other words, so long as the outdoor air absolute humidity is at or below the threshold X0 (kg/kg'), an indoor air absolute humidity can reach a target humidity if the Hi-level evaporating temperature range is set.

As regards an actual latent heat load, not only the temperature and humidity conditions of outdoor air but also an internal heat gain resulting from human bodies, outdoor air equipment, lighting equipment, and the like have to be taken into account. An approximate internal heat gain resulting from human bodies, outdoor air equipment, lighting equipment, and the like can be estimated for each structure, such as a building or a condominium, and there is little variation in this value. Accordingly, X0 can be calculated on the basis of an estimated value for each structure.

If the outdoor air temperature varies, the threshold X0 (kg/kg'), or the maximum outdoor air absolute humidity at which a latent heat load can be processed will vary little so long as the target humidity remains unchanged relative to a certain evaporating temperature. Consequently, X0 (kg/kg') can be determined as illustrated in FIGS. 8 and 9. The reason is as follows. Assuming that the evaporating temperature remains unchanged and the outdoor air temperature falls, the amount of total heat (the sum of sensible heat and latent heat) processed by the cooler 26 of the ventilator 3 decreases and a sensible heat factor (SHF) decreases, so that only the amount of sensible heat processed decreases but the amount of latent heat processed does not decrease.

Figure 10:
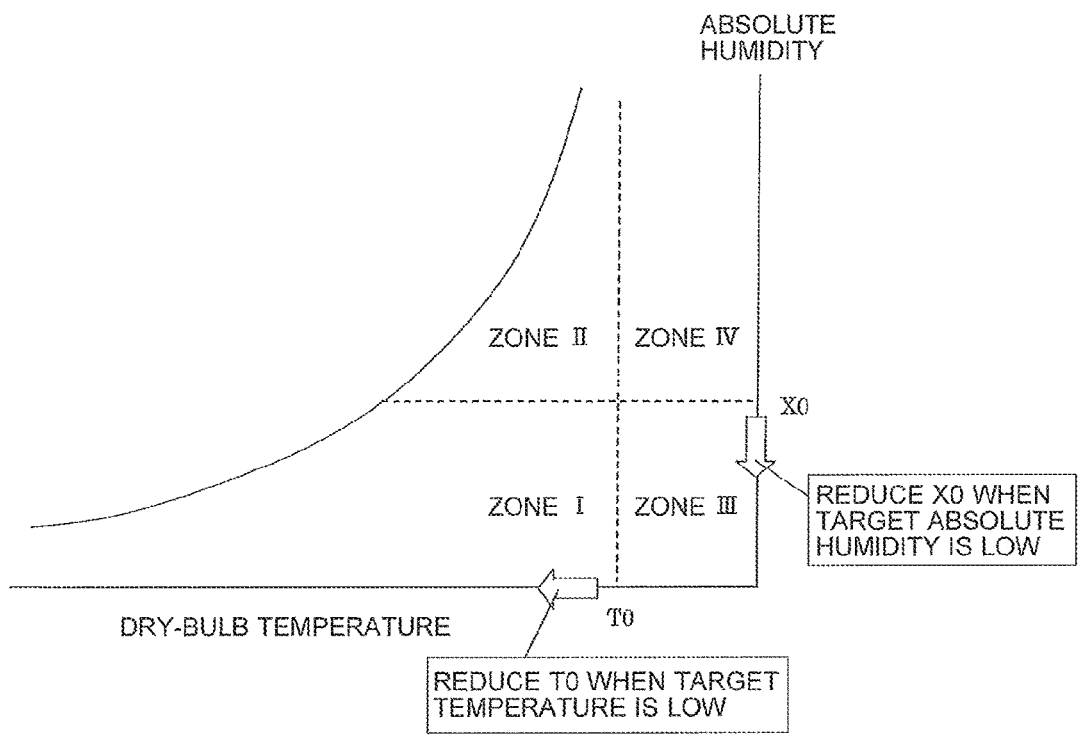
FIG. 10 is a psychrometric chart 3 of the air-conditioning system according to Embodiment of the present invention.

FIG. 10 is a psychrometric chart 3 of the air-conditioning system according to Embodiment of the present invention.

As illustrated in FIG. 10, the thresholds T0 (degrees C.) and X0 (kg/kg') may be changed on the basis of set values in the target temperature and humidity setting unit 44 illustrated in FIG. 1. If the same outdoor air temperature and humidity conditions are continued, a change in target temperature and a change in target absolute humidity will cause a change in sensible heat load and a change in latent heat load. When the target temperature is reduced, the sensible heat load increases. In this case, T0 (degrees C.) is reduced to increase the cooling capacity. Furthermore, when the target absolute humidity is reduced, the latent heat load increases. In this case, X0 (kg/kg') is reduced to increase the dehumidifying capacity.

This avoids insufficient cooling and insufficient dehumidification if the target temperature and the target absolute humidity are changed and the loads accordingly increase.

At this time, control may be performed such that the evaporating temperature levels of the indoor unit circuit 11 and those of the ventilator circuit 21 are switched from the Hi levels to the Lo levels on the basis of the indoor air temperature Ta (degrees C.) detected by the suction temperature and humidity detection unit 43 illustrated in FIG. 4 and the indoor air absolute humidity Xa (kg/kg') detected by the indoor air temperature and humidity detection unit 32 illustrated in FIG. 3.

Figure 11:
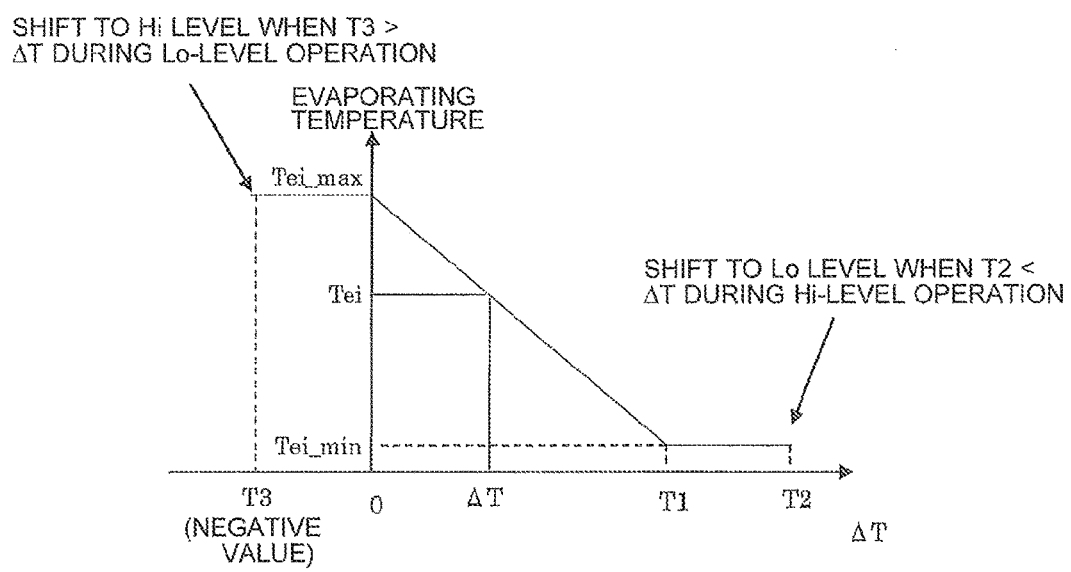
FIG. 11 is a Tei-$\Delta$T graph 2 of the air-conditioning system according to Embodiment of the present invention.

FIG. 11 is a Tei-ΔT graph 2 of the air-conditioning system according to Embodiment of the present invention.

For example, while the indoor unit circuit 11 is in an Hi-level operation, when the difference ΔT between the indoor air temperature Ta (degrees C.) detected by the suction temperature and humidity detection unit 43 and the target temperature Ta_tgt (degrees C.) set by the target temperature and humidity setting unit 44 is greater than a predetermined temperature T2 (degrees C.) (T1<T2) as illustrated in FIG. 11, it is determined that the cooling capacity is insufficient and the sensible heat load cannot be processed. The Hi levels are shifted to the Lo levels in order to increase the cooling capacity.

On the other hand, while the indoor unit circuit 11 is in an Lo-level operation, when the difference ΔT between the indoor air temperature Ta (degrees C.) and the target temperature Ta_tgt (degrees C.) is less than a predetermined temperature T3 (degrees C.) (<0) as illustrated in FIG. 11, it is determined that the cooling capacity is sufficient and the evaporating temperature can be further increased. The Lo level is shifted to Hi level in order to reduce the cooling capacity. Note that if the compressor 12 enters a thermostat-off state during the Lo-level operation, the Lo levels may be shifted to the Hi levels.

Figure 12:
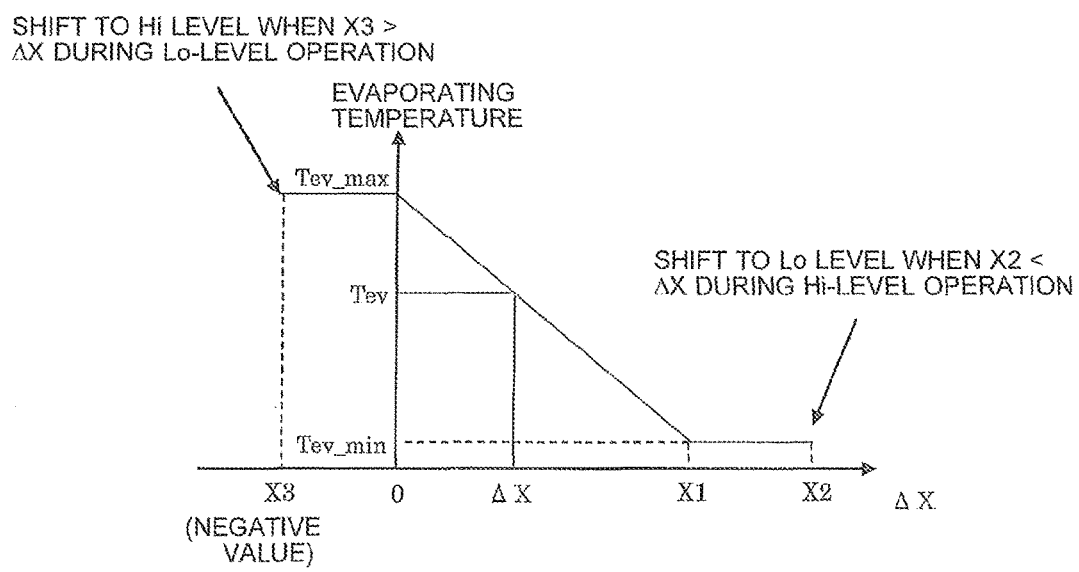
FIG. 12 is a Tev-$\Delta$X graph 2 of the air-conditioning system according to Embodiment of the present invention.

FIG. 12 is a Tev-ΔX graph 2 of the air-conditioning system according to Embodiment of the present invention.

For example, while the ventilator circuit 21 is in the Hi-level operation, when the difference ΔX between the indoor air absolute humidity Xa (kg/kg') detected by the indoor air temperature and humidity detection unit 32 and the target absolute humidity (set indoor humidity) Xa_tgt (kg/kg') set by the target temperature and humidity setting unit 44 is greater than a predetermined absolute humidity X2 (kg/kg') (X1<X2) as illustrated in FIG. 12, it is determined that the dehumidifying capacity is insufficient and the latent heat load cannot be processed. The Hi levels are shifted to the Lo levels in order to increase the dehumidifying capacity.

On the other hand, while the ventilator circuit 21 is in the Lo-level operation, when the difference ΔX between the indoor air absolute humidity Xa (kg/kg') and the target absolute humidity (set indoor humidity) Xa_tgt (kg/kg') is less than a predetermined absolute humidity X3 (kg/kg') (<0) as illustrated in FIG. 12, it is determined that the dehumidifying capacity is sufficient and the evaporating temperature can be further increased. The Lo levels are shifted to the Hi levels in order to reduce the dehumidifying capacity. Note that if the compressor 22 enters the thermostat-off state, the Lo levels may be shifted to the Hi levels.

As described above, feedback control based on the temperature and humidity conditions of indoor air can avoid insufficient cooling and insufficient dehumidification.

As regards the indoor air temperature Ta (degrees C.), a value detected by the indoor air temperature and humidity detection unit 32 illustrated in FIG. 3 may be used. As regards the indoor air absolute humidity Xa (kg/kg'), a value detected by the suction temperature and humidity detection unit 43 illustrated in FIG. 4 may be used.

Figure 13:
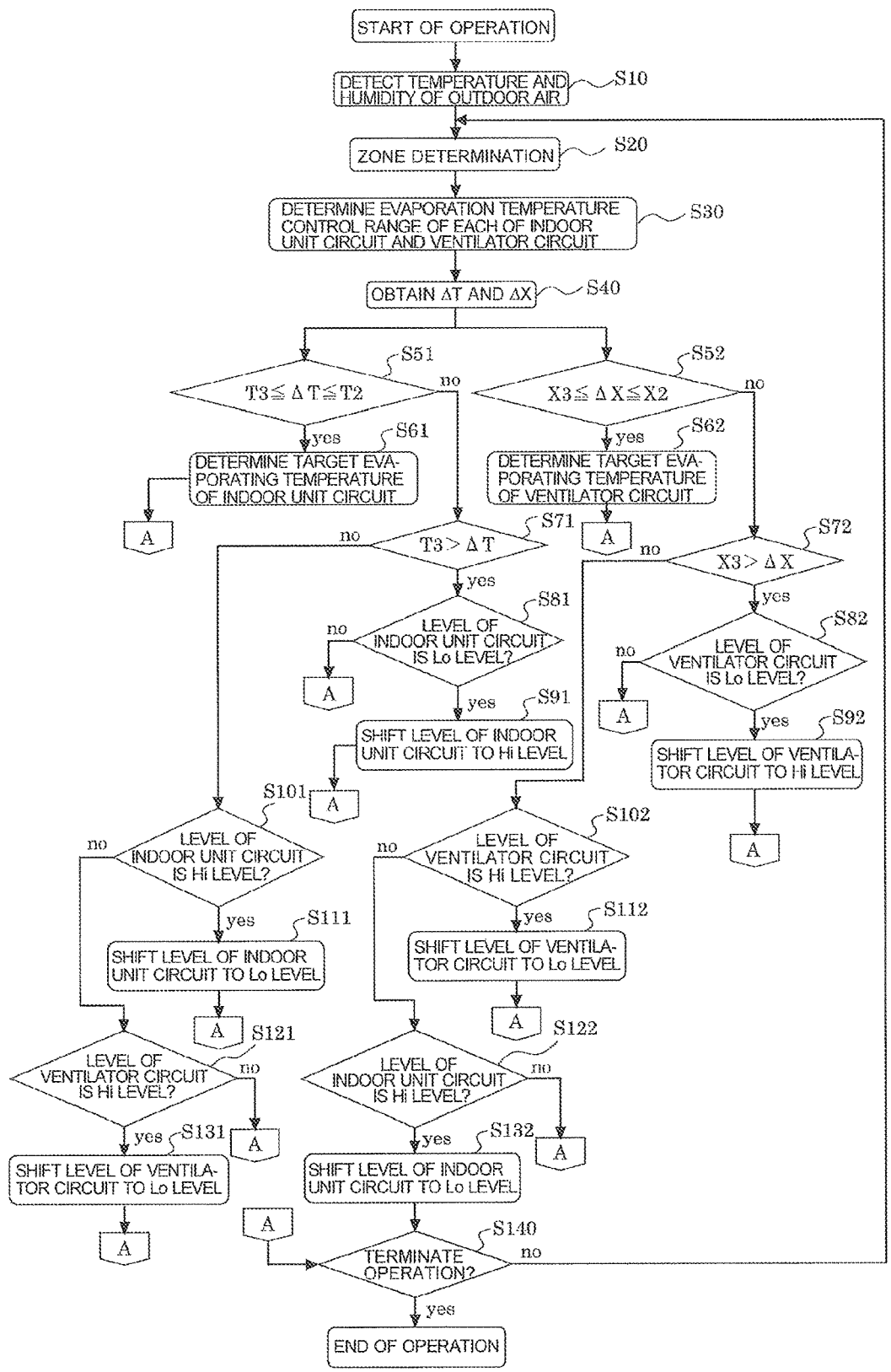
FIG. 13 is a flowchart of control by the air-conditioning system according to Embodiment of the present invention.

FIG. 13 is a flowchart of control by the air-conditioning system according to Embodiment of the present invention.

The above-described operation of the air-conditioning system 100 will now be described with reference to the control flowchart of FIG. 13.

After start-up of the air-conditioning system 100, the outdoor air temperature and humidity detection unit 31 detects the temperature and humidity of outdoor air (S10).

Zone determination is performed on the basis of the detected outdoor air temperature and humidity (S20). An evaporating temperature control range of each of the indoor unit circuit 11 and the ventilator circuit 21 is determined on the basis of the evaporating temperature levels (Hi levels or Lo levels) of the corresponding one of the indoor unit circuit 11 and the ventilator circuit 21 (S30).

Then, the difference ΔT (degrees C.) between the indoor air temperature Ta (degrees C.) and the target temperature Ta_tgt (degrees C.) is obtained and the difference ΔX (kg/kg') between the indoor air absolute humidity Xa (kg/kg') and the target absolute humidity Xa_tgt (kg/kg') is obtained (S40).

Whether ΔT (degrees C.) is greater than or equal to T3 (degrees C.) and is less than or equal to T2 (degrees C.) is determined (S51). If these conditions are satisfied, the target evaporating temperature Tei (degrees C.) is determined on the basis of the Tei-ΔT graph of FIG. 5 (S61). After that, whether to terminate the operation is determined (S140). If the operation is not terminated, the control returns to S20. The control is performed in the same manner in accordance with the flowchart.

Simultaneously, whether ΔX (kg/kg') is greater than or equal to X3 (kg/kg') and is less than or equal to X2 (kg/kg') is determined (S52). If these conditions are satisfied, the target evaporating temperature Tev (degrees C.) is determined on the basis of the Tev-ΔX graph of FIG. 6 (S62). After that, whether to terminate the operation is determined (S140). If the operation is not terminated, the control returns to S20. The control is performed in the same manner in accordance with the flowchart.

If the conditions are not satisfied in S51, whether ΔT (degrees C.) is less than T3 (degrees C.) is determined (S71). If this condition is satisfied, whether the current evaporating temperature levels of the indoor unit circuit 11 are the Lo level is determined (S81). If this condition is satisfied, the evaporating temperature level of the indoor unit circuit 11 is shifted to the Hi levels (S91). After that, whether to terminate the operation is determined (S140). If the operation is not terminated, the control returns to S20. The control is performed in the same manner in accordance with the flowchart.

If the conditions are not satisfied in S52, whether ΔX (kg/kg') is less than X3 (kg/kg') is determined (S72). If this condition is satisfied, whether the current evaporating temperature level of the ventilator circuit 21 is the Lo level is determined (S82). If this condition is satisfied, the evaporating temperature level of the ventilator circuit 21 is shifted to the Hi level (S92).

After that, whether to terminate the operation is determined (S140). If the operation is not terminated, the control returns to S20. The control is performed in the same manner in accordance with the flowchart.

If the condition is not satisfied in S81, whether to terminate the operation is determined (S140). If the operation is not terminated, the control returns to S20. The control is performed in the same manner in accordance with the flowchart. Furthermore, if the condition is not satisfied in S71, whether the current evaporating temperature levels of the indoor unit circuit 11 are the Hi levels is determined (S101). If this condition is satisfied, the evaporating temperature level of the indoor unit circuit 11 is shifted to the Lo levels (S111). After that, whether to terminate the operation is determined (S140). If the operation is not terminated, the control returns to S20. The control is performed in the same manner in accordance with the flowchart.

If the condition is not satisfied in S101, whether the current evaporating temperature level of the ventilator circuit 21 is the Hi level is determined (S121). If this condition is satisfied, the evaporating temperature level of the ventilator circuit 21 are shifted to the Lo levels (S131). After that, whether to terminate the operation is determined (S140). If the operation is not terminated, the control returns to S20. The control is performed in the same manner in accordance with the flowchart.

If the condition is not satisfied in S121, whether to terminate the operation is determined (S140). If the operation is not terminated, the control returns to S20. The control is performed in the same manner in accordance with the flowchart.

If the condition is not satisfied in S82, whether to terminate the operation is determined (S140). If the operation is not terminated, the control returns to S20. The control is performed in the same manner in accordance with the flowchart. Furthermore, if the condition is not satisfied in S72, whether the current evaporating temperature levels of the ventilator circuit 21 are the Hi levels is determined (S102). If this condition is satisfied, the evaporating temperature level of the ventilator circuit 21 is shifted to the Lo level (S112). After that, whether to terminate the operation is determined (S140). If the operation is not terminated, the control returns to S20. The control is performed in the same manner in accordance with the flowchart.

If the condition is not satisfied in S102, whether the current evaporating temperature level of the indoor unit circuit 11 is the Hi level is determined (S122). If this condition is satisfied, the evaporating temperature level of the indoor unit circuit 11 is shifted to the Lo level (S132). After that, whether to terminate the operation is determined (S140). If the operation is not terminated, the control returns to S20. The control is performed in the same manner in accordance with the flowchart.

If the condition is not satisfied in S122, whether to terminate the operation is determined (S140). If the operation is not terminated, the control returns to S20. The control is performed in the same manner in accordance with the flowchart.

Figure 14:
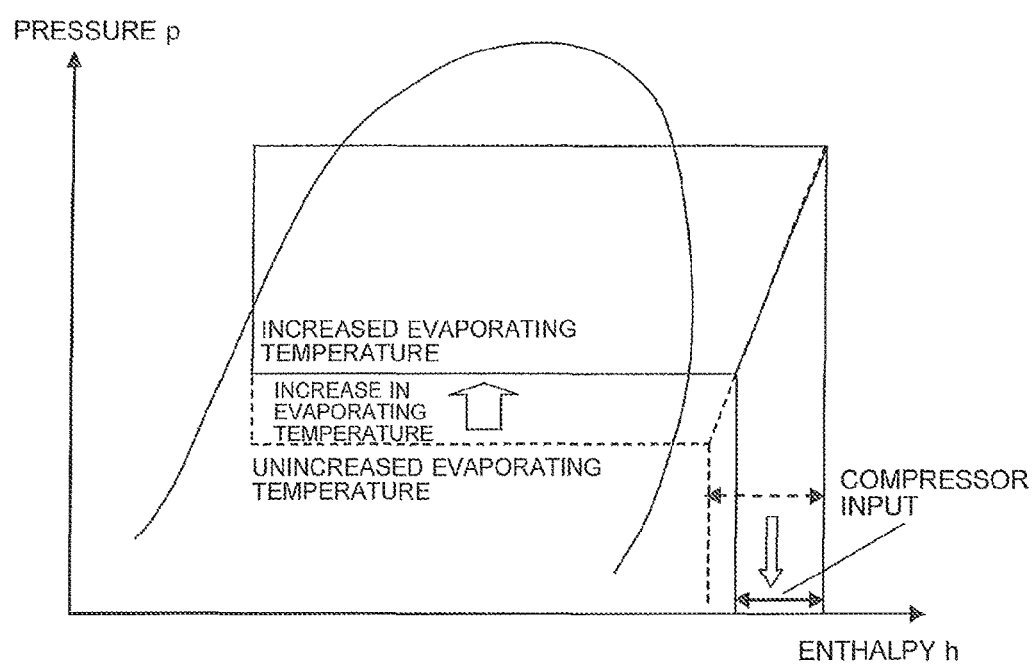
FIG. 14 is a graph illustrating the effect of increasing an evaporating temperature in the air-conditioning system according to Embodiment of the present invention.

FIG. 14 is a graph illustrating the effect of increasing an evaporating temperature in the air-conditioning system according to Embodiment of the present invention.

The above-described control enables the evaporating temperature to reach an optimum value in accordance with loads determined by the temperature and humidity of outdoor air. Specifically, increasing the evaporating temperature in response to a reduction in load while reliably processing the sensible heat load and the latent heat load can reduce excessive processing. Consequently, input power to the compressors 12 and 22 is reduced as illustrated in FIG. 14. This achieves enhancing energy-saving performance as well as maintaining comfort.

The loads are determined on the basis of the temperature and humidity of outdoor air detected by the outdoor air temperature and humidity detection unit 31. Accordingly, if it is determined that the loads are small, the operation can be performed with relatively high evaporating temperatures upon start-up, thus achieving the effect of energy saving during initial cooling (pull-down mode) upon start-up.

In addition, the sensible heat load and the latent heat load are estimated on the basis of the temperature and humidity of outdoor air detected by the outdoor air temperature and humidity detection unit 31, optimum evaporating temperatures are determined by feed-forward control, and after that, the optimum evaporating temperatures are modified by feedback control based on the temperature and humidity of indoor air detected by the indoor air temperature and humidity detection unit 32. Consequently, the time required to optimize the evaporating temperatures is short and variations in the loads can be followed, thus enhancing the energy-saving performance.

Although the Hi level and Lo level of Tei_max (degrees C.) and Tei_min (degrees C.) of the indoor unit circuit 11 and the Hi level and Lo level of Tev_max (degrees C.) and Tev_min (degrees C.) of the ventilator circuit 21 are set as evaporating temperature levels, a fixed value may be set. For example, a constant Hi level of 14 (degrees C.) or a constant Lo level of 0 (degrees C.) may be set.

Although switching between the Hi level and the Lo level is performed on the basis of the difference between the temperature of indoor air and a set temperature, the difference between the humidity of indoor air and a set humidity, and the temperature and humidity of outdoor air, the Hi or Lo levels may be shifted to the other levels in response to an external instruction. For example, the Lo level may be forcibly shifted to the Hi level in response to an energy-saving control instruction from the central controller 102, and the Hi level may be shifted to the Lo level in response to cancelling the energy-saving control instruction.

Although the maximum evaporating temperatures Tei_max and Tev_max (degrees C.), which are the upper limits of the evaporating temperature control ranges, and the minimum evaporating temperatures Tei_min and Tev_min (degrees C.), which are the lower limits of the evaporating temperature control ranges, each have two patterns in Embodiment, each of these temperatures may have two or more patterns.

In each of the outdoor air temperature and humidity detection unit 31, the indoor air temperature and humidity detection unit 32, and the suction temperature and humidity detection unit 43, the temperature and humidity may be detected by a single component or separate components.

Although the absolute humidity is used for humidity control in Embodiment, similar control may be performed on the basis of a relative humidity.

REFERENCE SIGNS LIST

1 indoor unit, 2 indoor-unit-circuit outdoor unit, 3 ventilator, 4 ventilator-circuit outdoor unit, 11 indoor unit circuit, 12 compressor, 13 four-way valve, 14 outdoor heat exchanger, 15 expansion valve, 16 indoor heat exchanger, 17 outdoor-heat-exchanger fan, 18 indoor-heat-exchanger fan, 21 ventilator circuit, 22 compressor, 23 four-way valve, 24 outdoor heat exchanger, 25 expansion valve, 26 cooler, 27 outdoor-heat-exchanger fan, 28 supply fan, 29 exhaust fan, 30 total heat exchanger, 31 outdoor air temperature and humidity detection unit, 32 indoor air temperature and humidity detection unit, 41 compressor frequency control unit, 42 evaporating temperature detection unit, 43 suction temperature and humidity detection unit, 44 target temperature and humidity setting unit, 100 air-conditioning system, 102 central controller, 103 transmission line, 104 refrigerant pipe, 105 refrigerant pipe

The invention claimed is:

1. An air-conditioning system comprising: a first refrigerant circuit configured to circulate therein a first refrigerant, the first refrigerant circuit including a first outdoor unit and an indoor unit; and a second refrigerant circuit configured to circulate therein a second refrigerant, the second refrigerant circuit including a second outdoor unit and a ventilator, the first refrigerant circuit including a first compressor, a first outdoor heat exchanger, a first expansion valve, and an indoor heat exchanger, the second refrigerant circuit including a second compressor, a second outdoor heat exchanger, a second expansion valve, and a cooler, the first outdoor unit including the first compressor and the first outdoor heat exchanger, the second outdoor unit including the second compressor and the second outdoor heat exchanger, the indoor unit including the first expansion valve and the indoor heat exchanger, and being configured to circulate indoor air while controlling a temperature of the indoor air, the ventilator including the second expansion valve and the cooler, and being configured to exchange the indoor air and outdoor air and control a temperature of the exchanged indoor air and the outdoor air, the first outdoor unit being connected to the indoor unit by first refrigerant piping, the second outdoor unit being connected to the ventilator by second refrigerant piping, the air-conditioning system further including a central controller and a sensor configured to detect a temperature of the outdoor air and a humidity of the outdoor air, the central controller being configured to: determine an evaporating temperature control range for the first refrigerant circuit based on the temperature of the outdoor air, control an evaporating temperature of the first refrigerant circuit to a target evaporating temperature determined within the evaporating temperature control range for the first refrigerant circuit, determine an evaporating temperature control range for the second refrigerant circuit based on the humidity of the outdoor air, control an evaporating temperature of the second refrigerant circuit to a target evaporating temperature determined within the evaporating temperature control range for the second refrigerant circuit, determine an upper limit and a lower limit of the evaporating temperature control range of the first refrigerant circuit to be lower for a temperature of the outdoor air exceeding a predetermined threshold T0 than for a temperature of the outdoor air below the threshold T0, determine an upper limit and a lower limit of the evaporating temperature control range of the second refrigerant circuit to be lower for a humidity of the outdoor air exceeding a predetermined threshold X0 than for a humidity of the outdoor air below the threshold X0, change the threshold T0 in accordance with a target temperature, the target temperature being a set indoor temperature, and change the threshold X0 in accordance with a target humidity, the target humidity being a set indoor humidity.

2. The air-conditioning system of claim 1, wherein the central controller is configured to: control the evaporating temperature of the first refrigerant circuit by controlling a frequency of the first compressor in the first refrigerant circuit, and control the evaporating temperature of the second refrigerant circuit by controlling a frequency of the second compressor in the second refrigerant circuit.

3. An air-conditioning system comprising: a first refrigerant circuit configured to circulate therein a first refrigerant, the first refrigerant circuit including a first outdoor unit and an indoor unit, and a second refrigerant circuit configured to circulate therein a second refrigerant, the second refrigerant circuit including a second outdoor unit and a ventilator, the first refrigerant circuit including a first compressor, a first outdoor heat exchanger, a first expansion valve, and an indoor heat exchanger, the second refrigerant circuit including a second compressor, a second outdoor heat exchanger, a second expansion valve, and a cooler, the first outdoor unit including the first compressor and the first outdoor heat exchanger, the second outdoor unit including the second compressor and the second outdoor heat exchanger, the indoor unit including the first expansion valve and the indoor heat exchanger, and being configured to circulate indoor air while controlling a temperature of the indoor air, the ventilator including the second expansion valve and the cooler, and being configured to exchange the indoor air and outdoor air and control a temperature of the exchanged indoor air and the outdoor air, the first outdoor unit being connected to the indoor unit by first refrigerant piping, the second outdoor unit being connected to the ventilator by second refrigerant piping, the air-conditioning system further including a central controller and a sensor configured to detect a temperature of the outdoor air and a humidity of the outdoor air, the central controller being configured to: determine an evaporating temperature control range for the first refrigerant circuit based on the temperature of the outdoor air, control an evaporating temperature of the first refrigerant circuit to a target evaporating temperature determined within the evaporating temperature control range for the first refrigerant circuit, determine an evaporating temperature control range for the second refrigerant circuit based on the humidity of the outdoor air, control an evaporating temperature of the second refrigerant circuit to a target evaporating temperature determined within the evaporating temperature control range for the second refrigerant circuit, determine an upper limit and a lower limit of the evaporating temperature control range of the first refrigerant circuit to be lower for a temperature of the outdoor air exceeding a predetermined threshold T0 than for a temperature of the outdoor air below the threshold T0, determine an upper limit and a lower limit of the evaporating temperature control range of the second refrigerant circuit to be lower for a humidity of the outdoor air exceeding a predetermined threshold X0 than for a humidity of the outdoor air below the threshold X0, determine the target evaporating temperature of the first refrigerant circuit based on a difference $\Delta T$ between the temperature of the indoor air and a set temperature, and determine the target evaporating temperature of the second refrigerant circuit based on a difference $\Delta X$ between the humidity of the indoor air and a set humidity, wherein when the difference $\Delta T=0$, the target evaporating temperature of the first refrigerant circuit is the upper limit of the evaporating temperature control range of the first refrigerant circuit, and when the difference $\Delta T$ is a predetermined value T1 that is greater than 0, the target evaporating temperature of the first refrigerant circuit is the lower limit of the evaporating temperature control range of the first refrigerant circuit, and wherein when the difference $\Delta X=0$, the target evaporating temperature of the second refrigerant circuit is the upper limit of the evaporating temperature control range of the second refrigerant circuit, and when the difference $\Delta X$ is a predetermined value X1 that is greater than 0, the target evaporating temperature of the second refrigerant circuit is the lower limit of the evaporating temperature control range of the second refrigerant circuit.

4. The air-conditioning system of claim 3,
wherein the target evaporating temperature of the first refrigerant circuit has a proportional relationship to the difference ΔT with a negative proportionality constant, and
wherein the target evaporating temperature of the second refrigerant circuit has a proportional relationship to the difference ΔX with a negative proportionality constant.

5. The air-conditioning system of claim 3, wherein the central controller is configured to: when the upper and lower limits of the evaporating temperature control range of the first refrigerant circuit are determined as first values and the difference ΔT is greater than a predetermined value T2 that is greater than the predetermined value T1, shift the upper and lower limits of the evaporating temperature control range of the first refrigerant circuit to values lower than the first values, and when the upper and lower limits of the evaporating temperature control range of the second refrigerant circuit are determined as second values, and the difference ΔX is greater than a predetermined value X2 that is greater than the predetermined value X1, shift the upper and lower limits of the evaporating temperature control range of the second refrigerant circuit to values lower than the second values.

6. The air-conditioning system of claim 3, wherein the central controller is configured to:
when the difference ΔT is less than a predetermined value T3 that is less than 0 and the upper and lower limits of the evaporating temperature control range of the first refrigerant circuit are determined as third values, shift the upper and lower limits of the evaporating temperature control range of the first refrigerant circuit to values higher than the third values, and
when the difference ΔX is less than a predetermined value X3 that is less than 0 and the upper and lower limits of the evaporating temperature control range of the second refrigerant circuit are determined as fourth values, shift the upper and lower limits of the evaporating temperature control range of the second refrigerant circuit to values higher than the fourth values.

* * * * *